United States Patent
Tanaka (10) Patent No.: US 8,031,065 B2
(45) Date of Patent: Oct. 4, 2011

(54) TIRE MONITOR DEVICE

(75) Inventor: Akitomo Tanaka, Kasugai (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 410 days.

(21) Appl. No.: 12/400,381

(22) Filed: Mar. 9, 2009

(65) Prior Publication Data

US 2009/0231115 A1 Sep. 17, 2009

(30) Foreign Application Priority Data

Mar. 11, 2008 (JP) ................. 2008-060475

(51) Int. Cl.
*B60C 23/00* (2006.01)
(52) U.S. Cl. .................. 340/447; 340/445; 340/442
(58) Field of Classification Search .................. 340/447, 340/445, 442, 438, 443, 444, 446, 448
See application file for complete search history.

(56) References Cited

U.S. PATENT DOCUMENTS

| | | | |
|---|---|---|---|
| 6,888,446 B2 * | 5/2005 | Nantz et al. | 340/433 |
| 7,250,851 B2 * | 7/2007 | Lefaure | 340/445 |
| 2004/0164854 A1 * | 8/2004 | Nantz et al. | 340/443 |
| 2006/0290484 A1 * | 12/2006 | Bauchot et al. | 340/442 |
| 2009/0002146 A1 * | 1/2009 | Lin | 340/447 |

FOREIGN PATENT DOCUMENTS

JP 2006-281977 A 10/2006

OTHER PUBLICATIONS

Extended European Search Report for European Application No. 09153959.3-2425 dated Jul. 7, 2009, 6 pages.

* cited by examiner

*Primary Examiner* — Travis Hunnings
(74) *Attorney, Agent, or Firm* — Osha • Liang LLP (57) ABSTRACT

A tire monitor device for a vehicle has a first antenna and a second antenna, a sensor unit attached to each of a front left tire, a front right tire, a back left tire, and a back right tire, and a determining unit. The tire monitor device is operable to transmit a response request signal from the first and second antennas with respect to at least one of the sensor units, and to monitor information of at least one of the tires based on a response signal returned from the at least one sensor unit in response to the response request signal. The first antenna is arranged at a position shifted by a predetermined amount in a left or right direction from an intermediate position between the front left and the front right tires. The second antenna is arranged at a position shifted by a predetermined amount in a left or right direction from an intermediate position between the back left and the back right tires. The sensor unit measures a reception level of the response request signal, and returns a measurement result in the response signal. The determining unit is operable to determine a position of each sensor unit based on information of the reception level of the response request signal contained in the response signal returned from each of the sensor units.

8 Claims, 10 Drawing Sheets

TIRE MONITOR DEVICE

BACKGROUND OF THE INVENTION

1. Technical Field

The present invention relates to a tire monitor device for monitoring information such as an air pressure and the like of a tire using wireless radio wave.

2. Related Art

Generally, a tire (also referred to as wheel) of a vehicle such as an automobile, a trailer, or an airplane is filled with gas such as air and nitrogen at a defined pressure, but the filled gas changes volume due to travel heat and the like of the tire or gradually decreases due to air leakage and the like. Therefore, in order to satisfactorily maintain traveling stability or to avoid worst cases such as an explosion (burst), a daily checkup such as a checkup using pneumatic gauge and the like is vital.

However, daily checkup can only be carried out while the vehicle is stopped, and furthermore, the daily checkup itself is not performed in many cases, and thus a technique of constantly monitoring the information (air pressure etc.) of the tire even while traveling is desired.

For such a technique, a "tire pressure monitoring system and puncture automatic repair device" disclosed in Japanese Unexamined Patent Publication No. 2006-281977 is known. This technique is hereinafter referred to as a "related art".

Figure 10:
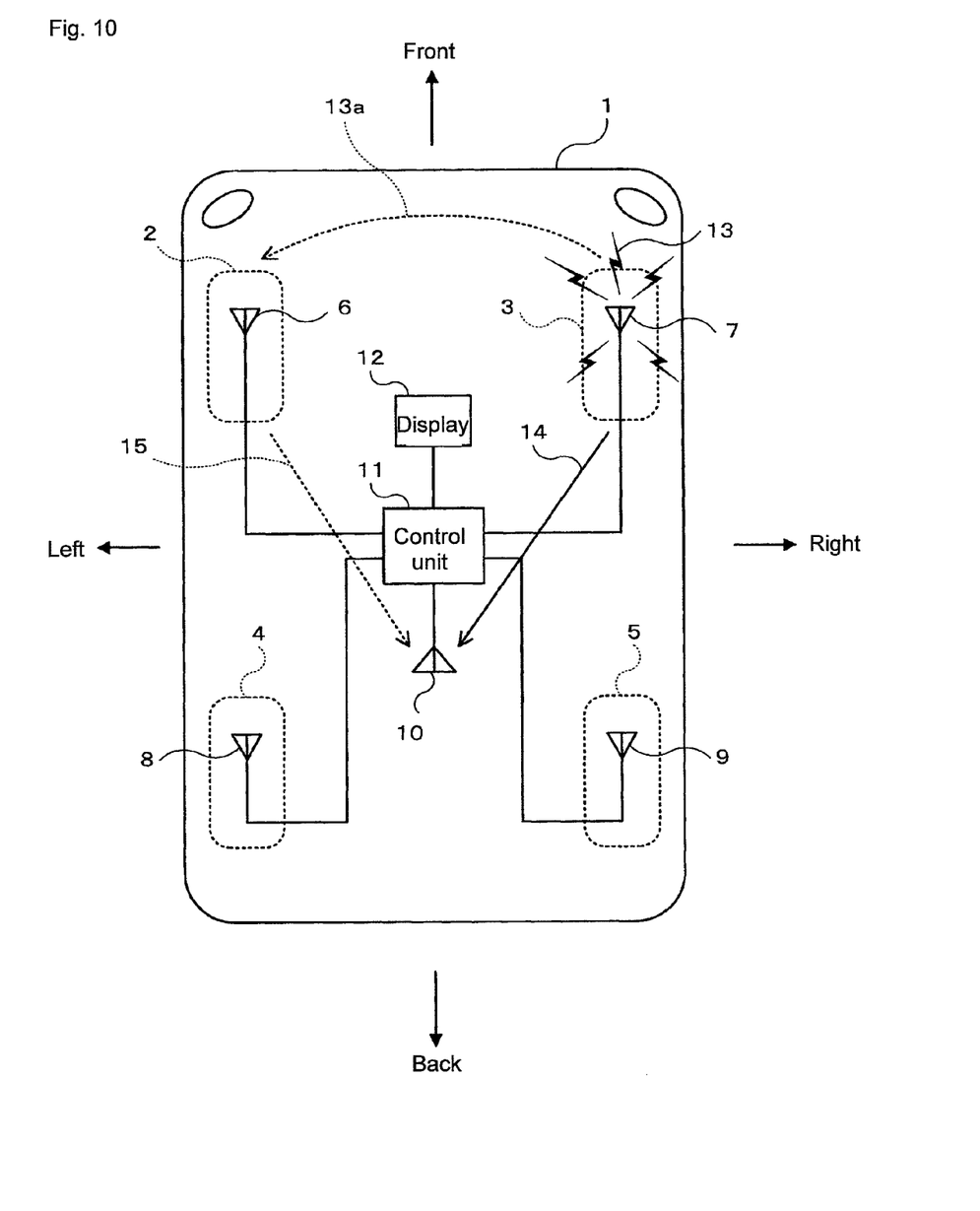
FIG. 10 shows a conceptual view of the related art.

FIG. 10 shows a conceptual view of the related art. In the figure, a vehicle such as an automobile (hereinafter simply referred to as vehicle) 1 is drawn looked down from above, where front, back, left and right are as shown in the figure. The top of the figure is "front", the bottom is "back", the left is "left", and the right is "right".

The vehicle 1 is a four-wheeled automobile with four tires 2 to 5. That is, the vehicle 1 includes a front left tire 2, a front right tire 3, a back left tire 4, and a back right tire 5. When a "position" of such tires is important, the tires are called the "front left", "front right", "back left", and "back right" tires, but in other cases, the tires are simply referred to as the "tire".

The tire monitor device of the related art includes four LF antennas 6 to 9 installed near (e.g., in tire house) the corresponding tires 2 to 5 of the vehicle 1, one UHF antenna 10 common to each tire 2 to 5, a control unit 11, and a display unit 12, and also includes a sensor unit (for sensing information such as air pressure and the like of tire, also referred to as transponder), which is not shown, attached to each tire 2 to 5.

Here, "LF" of the LF antennas 6 to 9 is an abbreviation for a wireless signal of low frequency band (e.g., several hundred KHz band), and similarly, "UHF" of the UHF antenna 10 is an abbreviation for wireless signal of high frequency band (e.g., several hundred MHz band).

Similar to each tire 2 to 5, when the "position" of the four LF antennas 6 to 9 is important, the antennas are called a "front left", "front right", "back left", and "back right" antennas, but in other cases, the LF antennas are simply referred to as the "LF antenna".

The tire monitor device of the related art configured as above operates in the following manner. The sensor unit (not shown) attached to each tire 2 to 5 is normally in a standby state (standby state of response request signal from LF antenna), where when receiving the response request signal from a nearby LF antenna, the sensor unit returns information of the attached tire (generally, information of air pressure, ID number unique to each sensor unit, and the like) with a UHF signal in response to the response request signal.

The control unit 11 performs a control of transmitting the response request signal in time division from each LF antenna 6 to 9 while itinerating through the four LF antennas 6 to 9 in order, and also performs a control of retrieving the response signal from each sensor unit with respect to the response request signal received at the UHF antenna 10 and reproducing information of each tire 2 to 5, and for example, determines whether or not the air pressure is at the defined air pressure, and outputs the determination result to the display unit 12 to notify a passenger of the vehicle 1.

Therefore, according to the related art, if the air pressure of a specific tire such as the front left tire 2 is lower than the defined air pressure, the lack of air pressure of the tire (front left tire 2) is determined in the control unit 11 from the information contained in the response signal transmitted from the sensor unit of the front left tire 2 with respect to the response request signal from the front left LF antenna 6, and the result is notified to the passenger through the display unit 12, so that necessary countermeasures can be immediately taken even during traveling to achieve traveling stability and safety. Other than the above-described related art, for example, the air pressure of the front left tire 2 may be stored in the control unit with respect to the response request signal from the front left LF antenna 6 with the ID number of the sensor unit contained in the response signal transmitted from the sensor unit of the front left tire 2 corresponded with the tire positional information of "front left tire". That is, the sensor unit ID is stored in a vehicle body side control device. If the ID number and the tire position are corresponded, which sensor unit of the tire position the response signal is from can be identified by identifying the ID number contained in the response signal intermittently transmitted by the sensor unit without transmitting the response request signal from the LF antenna.

The operation of the related art is satisfied based on an assumption that four tires 2 to 5 and four LF antennas 6 to 9 are paired one to one to carry out "response request" and "response". That is, in order to obtain the operation of the related art, only the sensor unit of the front left tire 2 responds with respect to the response request of the front left LF antenna 6, only the sensor unit of the front right tire 3 responds to the response request of the front right LF antenna 7, only the sensor unit of the back left tire 4 responds to the response request of the back left LF antenna 8, and only the sensor unit of the back right tire 5 responds to the response request of the back right antenna 9.

To this end, the LF antenna and the tire that form a pair need to be brought as close as possible, but an attachment position of the sensor unit to the tire is a predetermined position on an outer periphery of the wheel, or a predetermined position on an inner wall of the tire, where either position is biased in a radial direction of the tire, and thus a distance with the LF antenna becomes closer or distant with the rotation of the tire, whereby a gain and a radiation pattern, transmission power, and the like of the LF antenna need to be suitably adjusted in view of a maximum distant distance with the LF antenna.

However, the vehicle 1 incorporating the tire monitor device is not only one type (one vehicle model), and the shape of the body is different, the size of the tire as well as the shape of the tire house are different, and furthermore, the distance between the tires (distance of front, back, left, and right) is also different, and thus the gain and the radiation pattern, the transmission power and the like of the LF antenna need to be adjusted each time in correspondence to such difference, which obviously takes time and effort.

For instance, assume making an adjustment so that only the sensor unit of the front right tire 3 responds to the response request of the front right LF antenna 7. Specifically, in FIG. 10, a case of adjusting such that only the sensor unit of the front right tire 3 returns a response signal 14 with respect to a response request signal 13 of the front right LF antenna 7 is considered. The purpose of adjustment in this case is to have only the sensor unit of the front right tire 3 to return the response signal 14, in other words, to have other tires not to respond. A characteristic that a magnetic force exponentially attenuates as the distance becomes further apart in a free space is provided. If metal such as a vehicle exists, the magnetic force is transmitted along a metal surface, and thus reception is facilitated at the sensor unit attached to the front left tire 2, which is not desired (see reference numeral 13a). A so-called crosstalk then easily occurs.

In this case, the gain or the radiation pattern, the transmission power, and the like of the front right LF antenna 7 are adjusted such that only the sensor unit of the front right tire 3 returns the response signal 14, that is, the sensor unit of the front left tire 2 does not return a response signal 15. In performing such adjustment, the sensor unit of which tire is responding cannot be determined and thus adjustment is difficult in the related art.

For example, whether the sensor unit of the front right tire 3 is returning the response signal 14, or whether the sensor unit of the front left tire 2 is returning the response signal 15 with respect to the response request signal 13 of the right left LF antenna 7 cannot be determined. Thus, in the related art, the adjustment of the LF antenna can only be carried out through a trial and error method, whereby extra trouble and time are required by such amount.

SUMMARY

In the related art, four antennas are required, and adjustment to prevent crosstalk is difficult.

One or more embodiments of the present invention provides a tire monitor device capable of grasping a position of a sensor unit (tire) returning a response signal with few number of antennas without preventing crosstalk but using the crosstalk, and enabling efficient adjustment.

A first aspect of the present invention relates to a tire monitor device for transmitting a response request signal from first and second antennas with respect to a sensor unit attached to a tire of a vehicle, and monitoring information of the tire based on a response signal returned from the sensor unit in response to the response request signal; wherein the tire is arranged at front left, front right, back left, and back right, and the sensor unit is attached to each of a plurality of the tires; the first antenna is arranged at a position shifted by a predetermined amount in either left or right direction of the vehicle from an intermediate position between the tires positioned at the front left and the front right of the vehicle of the plurality of tires; the second antenna is arranged at a position shifted by a predetermined amount in either left or right direction of the vehicle from an intermediate position between the tires positioned at the back left and the back right of the vehicle of the plurality of tires; the sensor unit measures a reception level of the response request signal, and returns the measurement result in the response signal; and a determining unit for determining position of each sensor unit based on information of the reception level of the response request signal contained in the response signal returned from each of the sensor unit is further arranged.

In accordance with a second aspect of the present invention the sensor unit includes a measurement unit for measuring the reception level of the response request signal transmitted from the antenna as an average value, an integrated value, or a peak value in between of one rotation or a few rotations of the tire.

In accordance with a third aspect of the present invention, the antenna is a low frequency band LF antenna, and the determining unit receives the response signal from the sensor unit with a high frequency band UHF antenna.

A fourth aspect of the present invention relates to a tire monitor device for transmitting a response request signal from first and second antennas with respect to a sensor unit attached to a tire of a vehicle, and monitoring information of the tire based on a response signal returned from the sensor unit in response to the response request signal; wherein the tire is arranged at front left, front right, back left, and back right, and the sensor unit is attached to each of a plurality of the tires; the first antenna is arranged at a position shifted by a predetermined amount in either front or back direction of the vehicle from an intermediate position between the tires positioned at the front left and the back left of the vehicle of the plurality of tires; the second antenna is arranged at a position shifted by a predetermined amount in either front or back direction of the vehicle from an intermediate position between the tires positioned at the front right and the back right of the vehicle of the plurality of tires; the sensor unit measures a reception level of the response request signal, and returns the measurement result in the response signal; and a determining unit for determining position of each sensor unit based on information of the reception level of the response request signal contained in the response signal returned from each of the sensor unit is further arranged.

In accordance with a fifth aspect of the present invention, the sensor unit includes a measurement unit for measuring the reception level of the response request signal transmitted from the antenna as an average value, an integrated value, or a peak value in between of one rotation or a few rotations of the tire.

In accordance with a sixth aspect of the present invention, the antenna is a low frequency band LF antenna, and the determining unit receives the response signal from the sensor unit with a high frequency band UHF antenna.

According to one or more embodiments of the present invention, an antenna for transmitting a response request signal is arranged at a position shifted by a predetermined amount in either a left or right direction from an intermediate position of a left and right sensor units, and an antenna for transmitting a response request signal is arranged at a position shifted by a predetermined amount in either a front or back direction from an intermediate position of a front and back sensor units, and thus the position of each sensor unit is determined by comparing the reception level in each sensor unit of the response request signal transmitted from such antennas.

Therefore, a tire monitor device in which the number of LF antennas can be reduced to two in a case of four-wheeled vehicles, and the position of the sensor unit (tire) returning the response signal can be grasped while reducing cost can be provided.

DETAILED DESCRIPTION

An embodiment of the present invention will now be described based on the drawings. In the following description, an example of a tire monitor device applied to a vehicle such as automobile will be described, but is not limited thereto. A tire that rotates while being in contact with a road surface and the like merely needs to be equipped, and may be a tow car (trailer etc. for transporting loads and for camping) without a self-traveling unit, or may be an airplane equipped with tires for take off and landing.

<First Arrangement Example of LF Antenna: Example of Front and Back Arrangement>

Figure 1:
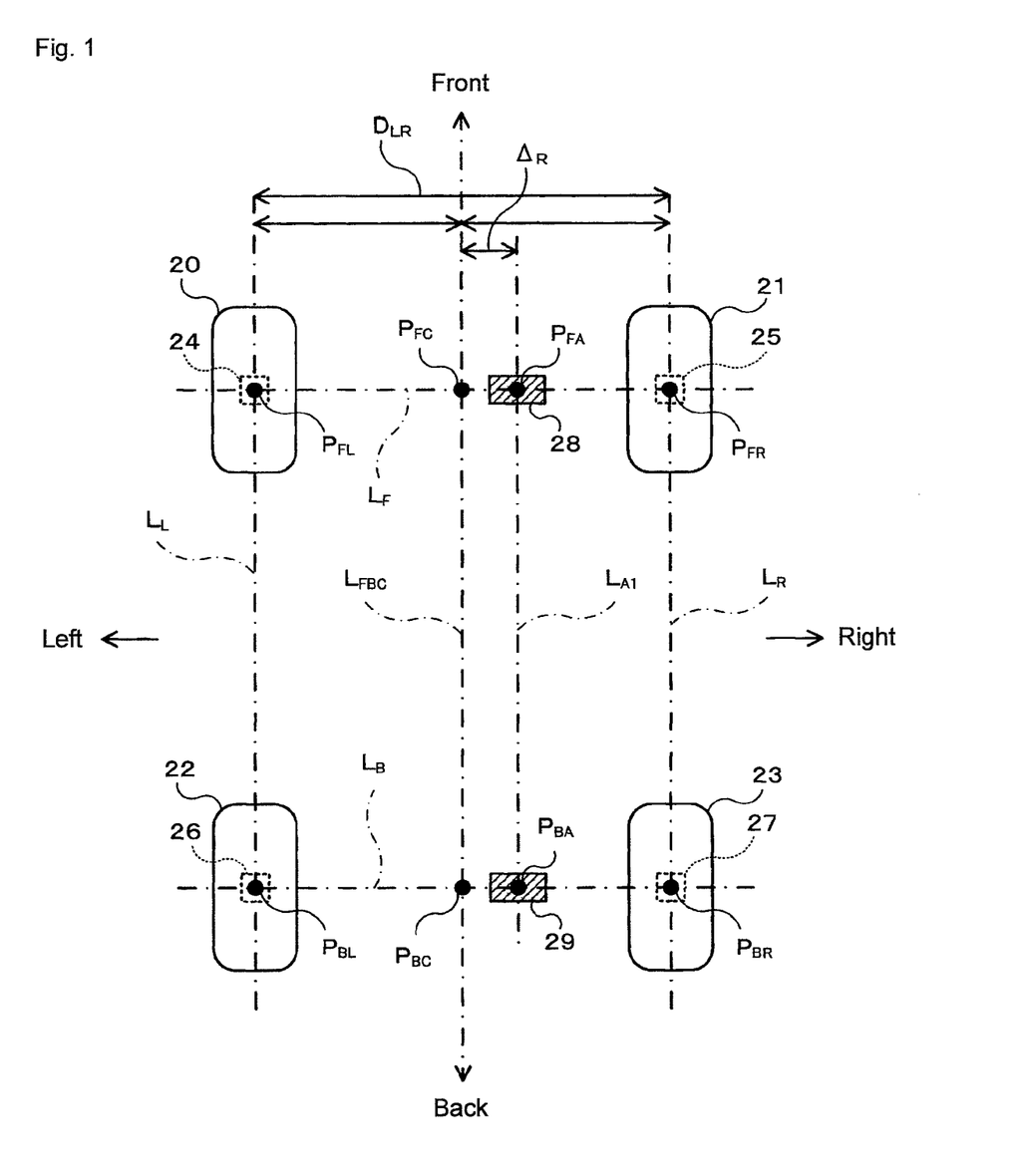
FIG. 1 is a conceptual view showing a first arrangement example (example of front and back arrangement) of an LF antenna according to an embodiment of the present invention.

FIG. 1 is a conceptual view showing a first arrangement example (example of front and back arrangement) of an LF antenna according to an embodiment of the present invention. In the figure, an applied vehicle of the present embodiment is not particularly limited thereto, but in a state the vehicle is viewed from above in a four-wheeled automobile with four traveling tires, it is assumed that an "upper left", an "upper right", a "lower left" and a "lower right" portion of the figure are each provided with one tire. An upper left tire is referred to as a "front left tire 20", an upper right tire is referred to as a "front right tire 21", a lower left tire is referred to as a "back left tire 22", and a lower right tire is referred to as a "back right tire 23".

The center of rotation of the front left tire 20 is $P_{FL}$, the center of rotation of the front right tire 21 is $P_{FR}$, the center of rotation of the back left tire 22 is $P_{BL}$, and the center of rotation of the back right tire 23 is $P_{BR}$. A line (front virtual line) passing through the center of rotation $P_{FL}$ of the front left tire 20 and the center of rotation $P_{FR}$ of the front right tire 21 is $L_F$, and a line (back virtual line) passing through the center of rotation $P_{BL}$ of the back left tire 22 and the center of rotation $P_{BR}$ of the back right tire 23 is $L_B$. A line (left virtual line) passing through the center of rotation $P_{FL}$ of the front left tire 20 and the center of rotation $P_{BL}$ of the back left tire 22 is $L_L$, and a line (right virtual line) passing through the center of rotation $P_{FR}$ of the front right tire 21 and the center of rotation $P_{BR}$ of the back right tire 23 is $L_R$. The distance between the left and right tires (distance between left virtual line $L_L$ and right virtual line $L_R$) is $D_{LR}$. Note that a subscript "F" means "front, the subscript "B" means "back", the subscript "L" means "left", and the subscript "R" means "right".

The four tires (front left tire 20, front right tire 21, back left tire 22, and back right tire 23) are respectively attached with a sensor unit 24 to 27 for sensing information such as an air pressure, which are denoted as "front left", "front right", "back left", and "back right" when distinguishing a position of each sensor unit, similar to the tire. In other words, the front left sensor unit 24 is attached to the front left tire 20, the front right sensor unit 25 is attached to the front right tire 21, the back left sensor unit 26 is attached to the back left tire 22, and the back right sensor unit 27 is attached to the back right tire 27.

In the figure, the installed positions of each sensor unit 24 to 27 are coincided with the center of rotations $P_{FL}$, $P_{FR}$, $P_{BL}$, and $P_{BR}$ of each tire 20 to 23 for the sake of convenience of illustration. As described at the beginning, the attachment position of each sensor unit 24 to 27 to the tire is, for example, a predetermined position on an outer periphery of the wheel or a predetermined position of an inner wall of the tire, where either position is biased in a radial direction of the tire, and thus repeatedly reciprocates in the front and back direction (up and down direction in the figure) from the center of rotation $P_{FL}$, $P_{FR}$, $P_{BL}$, and $P_{BR}$ of each tire 20 to 23 with the rotation of the tire.

In a case of a four-wheeled automobile, four LF antennas of the same number as the tires are required in the related art described at the beginning, but only a half or two LF antennas are required in the present embodiment. The two LF antennas are hereinafter referred to as a "front LF antenna 28" and a "back LF antenna 29" in the first arrangement example (example of front and back arrangement). In one or more embodiments of the present invention, the "front LF antenna 28" and the "back LF antenna 29" correspond to a first antenna and a second antenna.

Specific positions of the two LF antennas (front LF antenna 28 and back LF antenna 29) in the first arrangement example are as follows.

The front LF antenna 28 is installed at a position $P_{FA}$ substantially on the line of the front virtual line $L_F$, and shifted by a predetermined amount $\Delta_R$ in either left or right direction (right direction herein) from an intermediate point $P_{FC}$ of the front virtual line $L_F$. Similarly, the back LF antenna 29 is installed at a position $P_{BA}$ substantially on the line of the back virtual line $L_B$, and shifted by a predetermined amount $\Delta_R$ in either left or right direction (right direction herein) from an intermediate point $P_{BC}$ of the back virtual line $L_B$. A virtual line $L_{A1}$ is a line passing through the installed position $P_{FA}$ of the front LF antenna 28 and the installed position $P_{BA}$ of the back LF antenna 29, and a virtual line $L_{FBC}$ is a line passing through the intermediate point $P_{FC}$ of the front virtual line $L_F$ and the intermediate point $P_{BC}$ of the back virtual line $L_B$. The subscript "C" means "intermediate", and the subscript "A" means "antenna".

<Second Arrangement Example of LF Antenna: Example of Left and Right Arrangement>

Figure 2:
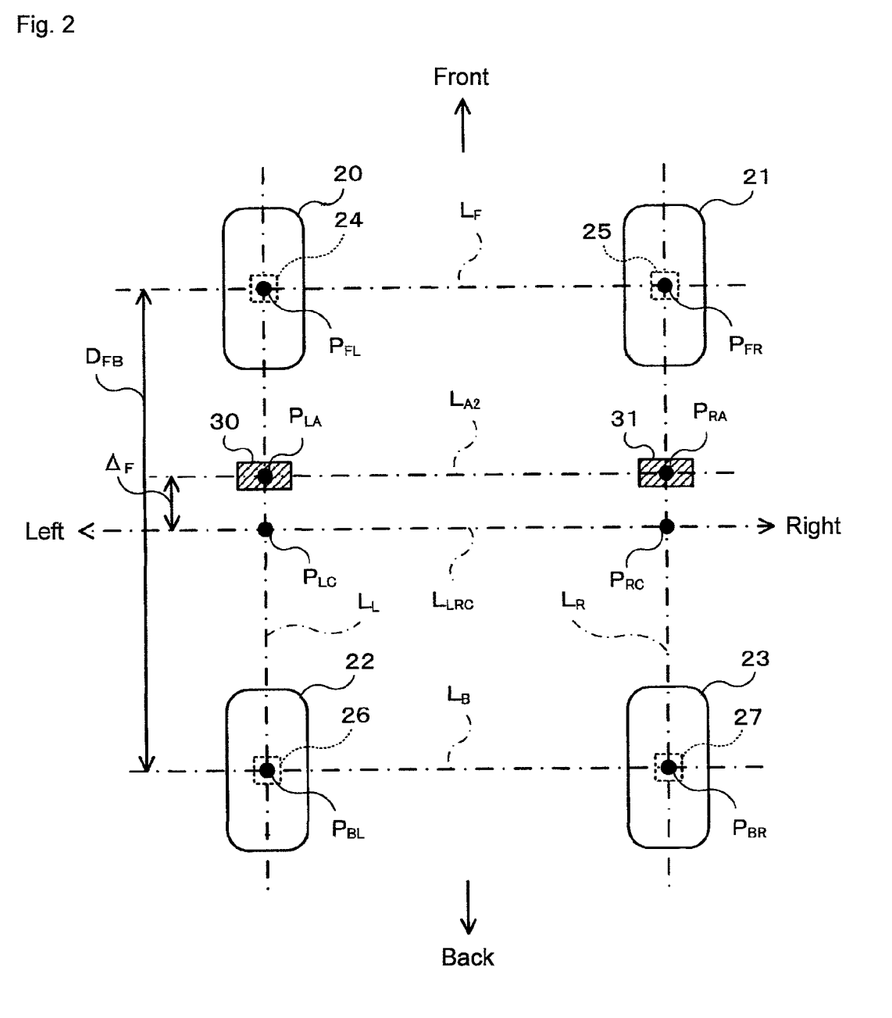
FIG. 2 is a conceptual view showing a second arrangement example (example of left and right arrangement) of the LF antenna according to an embodiment of the present invention.

FIG. 2 is a conceptual view showing a second arrangement example (example of left and right arrangement) of the LF antenna according to an embodiment of the present invention. For each reference numeral in the figure, those same as the first arrangement example is denoted with the reference numeral of the relevant position.

The second arrangement example will be hereinafter described, but in the following description, considerable portion is the same as the description of the first arrangement example. Therefore, the description may be redundant, but this redundancy is to provide accuracy.

In the figure, an applied vehicle of the present embodiment is not particularly limited thereto, but in a state the vehicle is viewed from above in a four-wheeled automobile with four traveling tires, it is assumed that an "upper left", an "upper right", a "lower left" and a "lower right" portion of the figure are each provided with one tire. An upper left tire is referred to as a "front left tire 20", an upper right tire is referred to as a "front right tire 21", a lower left tire is referred to as a "back left tire 22", and a lower right tire is referred to as a "back right tire 23".

The center of rotation of the front left tire 20 is $P_{FL}$, the center of rotation of the front right tire 21 is $P_{FR}$, the center of rotation of the back left tire 22 is $P_{BL}$, and the center of rotation of the back right tire 23 is $P_{BR}$. A line (front virtual line) passing through the center of rotation $P_{FL}$ of the front left tire 20 and the center of rotation $P_{FR}$ of the front right tire 21 is $L_F$, and a line (back virtual line) passing through the center of rotation $P_{BL}$ of the back left tire 22 and the center of rotation $P_{BR}$ of the back right tire 23 is $L_B$. A line (left virtual line) passing through the center of rotation $P_{FL}$ of the front left tire 20 and the center of rotation $P_{BL}$ of the back left tire 22 is $L_L$, and a line (right virtual line) passing through the center of rotation $P_{FR}$ of the front right tire 21 and the center of rotation $P_{BR}$ of the back right tire 23. The distance between the front and right tires (distance between front virtual line $L_F$ and back virtual line $L_B$) is $D_{FB}$. The subscript "F" means "front", the subscript "B" means "back", the subscript "L" means "left", and the subscript "R" means "right".

The four tires (front left tire 20, front right tire 21, back left tire 22, and back right tire 23) are respectively attached with a sensor unit 24 to 27 for sensing information such as air pressure, which are denoted as "front left", "front right", "back left", and "back right" when distinguishing the position of each sensor unit, similar to the tire. In other words, the front left sensor unit 24 is attached to the front left tire 20, the front right sensor unit 25 is attached to the front right tire 21, the back left sensor unit 26 is attached to the back left tire 22, and the back right sensor unit 27 is attached to the back right tire 23.

In the figure, the installed positions of each sensor unit 24 to 27 are coincided with the center of rotations $P_{FL}$, $P_{FR}$, $P_{BL}$, and $P_{BR}$ of each tire 20 to 23 for the sake of convenience of illustration. As described at the beginning, the attachment position of each sensor unit 24 to 27 to the tire is, for example, a predetermined position on the outer periphery of the wheel or a predetermined position of the inner wall of the tire, where either position is biased in the radial direction of the tire, and thus repeatedly reciprocates in the front and back direction (up and down direction in the figure) from the center of rotation $P_{FL}$, $P_{FR}$, $P_{BL}$, and $P_{BR}$ of each tire 20 to 23 with the rotation of the tire.

In the case of the four-wheeled automobile, four LF antennas of the same number as the tires are required in the related art described at the beginning, but only a half or two LF antennas are required in the present embodiment. The two LF antennas are hereinafter referred to as a "left LF antenna 30" and a "right LF antenna 31" in the second arrangement example (example of left and right arrangement). According to one or more embodiments of the present invention, the "left LF antenna 30" and the "right LF antenna 31" correspond to a first antenna and a second antenna.

Specific positions of the two LF antennas (left LF antenna 30 and right LF antenna 31) in the second arrangement example are as follows.

The left LF antenna 30 is installed at a position $P_{LA}$ substantially on the line of the left virtual line $L_L$, and shifted by a predetermined amount $\Delta_F$ in either a front or back direction (front direction herein) from an intermediate point $P_{LC}$ of the left virtual line $L_L$. Similarly, the right LF antenna 31 is installed at a position $P_{RA}$ substantially on the line of the right virtual line $L_R$, and shifted by a predetermined amount $\Delta_F$ in either a front or back direction (front direction herein) from an intermediate point $P_{RC}$ of the right virtual line $L_R$. A virtual line $L_{A2}$ is a line passing through the installed position $P_{LA}$ of the left LF antenna 30 and the installed position $P_{RA}$ of the right LF antenna 31, and a virtual line $L_{LRC}$ is a line passing through the intermediate point $P_{LC}$ of the left virtual line $L_L$ and the intermediate point $P_{RC}$ of the right virtual line $L_R$. The subscript "C" means "intermediate", and the subscript "A" means "antenna".

<Summary of First Arrangement Example and Second Arrangement Example>

Therefore, in the first arrangement example (example of front and back arrangement: FIG. 1), the point is that the "front LF antenna 28" is installed at a position $P_{FA}$ substantially on the line of the front virtual line $L_F$, and shifted by a predetermined amount $\Delta_R$ in the right direction from the intermediate point $P_{FC}$ of the front virtual line $L_F$; and the "back LF antenna 29" is installed at a position $P_{BA}$ substantially on the line of the back virtual line $L_B$, and shifted by a predetermined amount $\Delta_R$ in the right direction from the intermediate point $P_{BC}$ of the back virtual line $L_B$.

In the second arrangement example (example of left and right arrangement: FIG. 2), the point is that "the left LF antenna 30" is installed at a position $P_{LA}$ substantially on the line of the left virtual line $L_L$, and shifted by a predetermined amount $\Delta F$ in the front direction from the intermediate point $P_{LC}$ Of the left virtual line $L_L$, and "the right LF antenna 31" is installed at a position $P_{RA}$ substantially on the line of the right virtual line $L_R$, and shifted by a predetermined amount $\Delta_F$ in the front direction from the intermediate point $P_{RC}$ of the right virtual line $L_R$.

Through the use of either the first arrangement example or the second arrangement example having the above point, a tire monitor device capable of grasping the position of the sensor unit (tire) returning the response signal with few number of antennas (compared to the related art), and enabling efficient adjustment can be provided as hereinafter described in detail.

<Antenna Radiation Pattern of First Arrangement Example>

Figure 3:
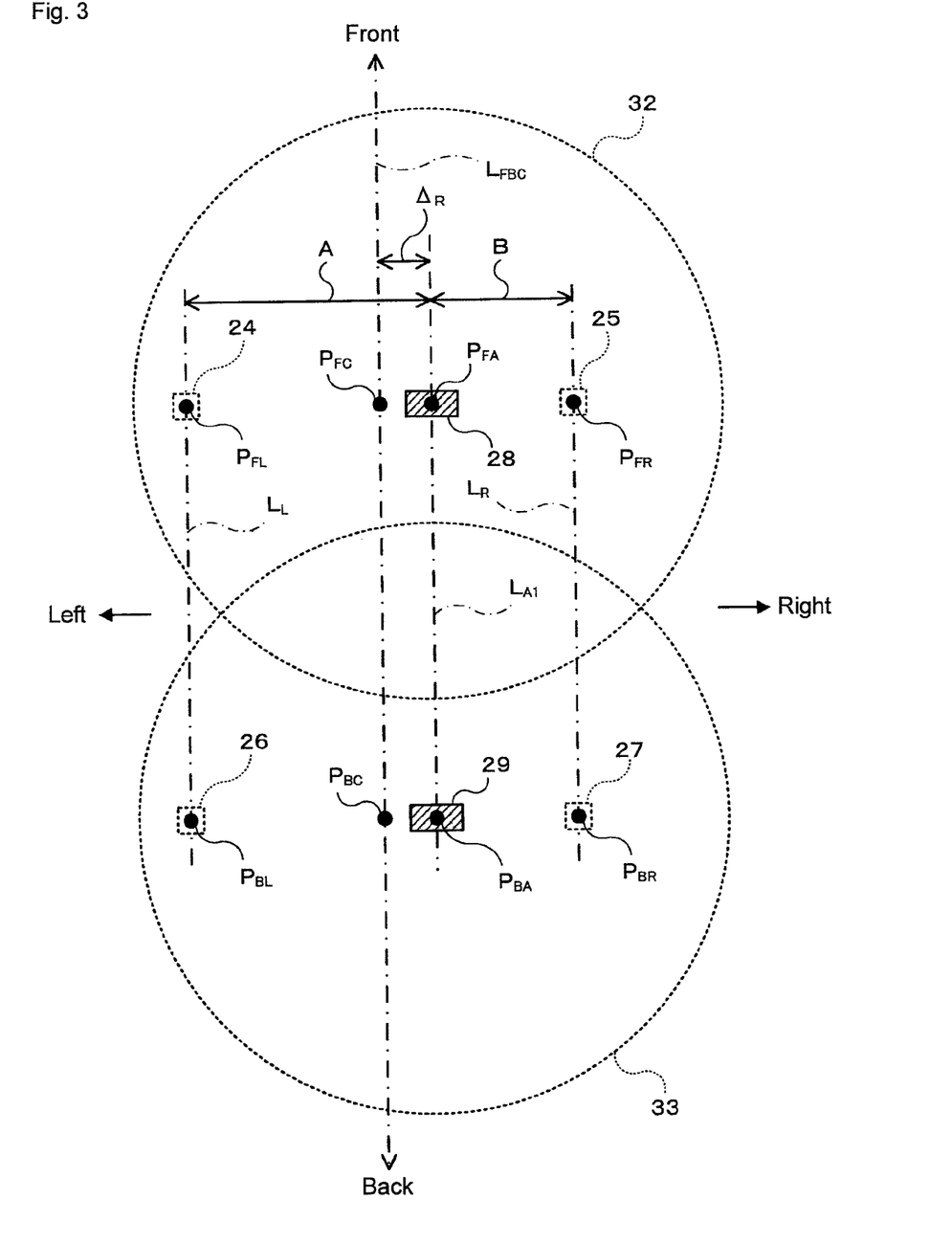
FIG. 3 is a brief schematic view showing a radiation pattern in the horizontal direction of a front LF antenna 28 and a back LF antenna 29 in the first arrangement example.
Figure 5A:
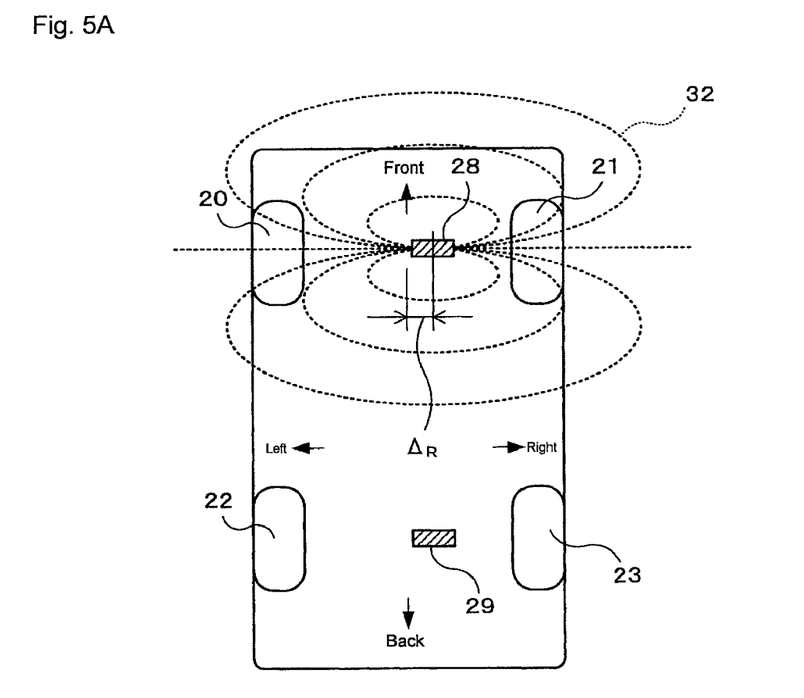
FIGS. 5A and 5B are views showing actual radiation patterns in the first and the second arrangement examples.

FIG. 3 is a brief schematic view showing a radiation pattern in the horizontal direction of the front LF antenna 28 and the back LF antenna 29 in the first arrangement example (example of front and back arrangement: FIG. 1). In the figure, radiation patterns 32, 33 of the LF antennas 28, 29 are drawn as a non-directional pattern (substantially circular pattern) for the sake of convenience of the explanation. Actually, as shown in FIG. 5A, a coil shaft of the front LF antenna 28 is coincided with a coil shaft of a sensor side LF reception antenna (not shown) incorporated in the front left tire 20 and the front right tire 21 arranged in the left and right direction, and similarly, a coil shaft of the back LF antenna 29 is coincided with a coil shaft of a sensor side LF reception antenna (not shown) incorporated in the back left tire 22 and the back right tire 23 arranged in the left and right direction. The radiation pattern (magnetic flux) of the front LF antenna 28 then becomes parallel to the magnetic flux of the sensor by arranging the coil shaft in the above manner. That is, the response request signal transmitted from the front LF antenna 28 is easily received at the sensor incorporated in the front left tire 20 and the front right tire 21, but is hard to be received at the sensor incorporated in the back left tire 22 and the back right sensor 23. Therefore, adjustment of the transmission power of the front LF antenna 28 and the like can be easily carried out for only two sensors desiring response to receive the signal. The radiation pattern (magnetic flux) of the back LF antenna 29 is also parallel to the magnetic flux of the sensor, and thus is similar.

The illustrated radiation patterns 32, 33 are plotted with limit distance the response request signal transmitted from the respective LF antenna (front LF antenna 28 and back LF antenna 29) is normally received by the sensor unit 24 to 27 of each tire 20 to 23. That is, the strength of the radio wave transmitted from the antenna generally decreases exponentially the farther the distance from the antenna, and cannot be normally received beyond a certain distance (limit distance). The illustrated radiation patterns 32, 33 show such limit distance.

The first important point of the first arrangement example is that two sensor units positioned in the left and right direction of the vehicle of the sensor units are in the respective radiation pattern 32, 33 of the front LF antenna 28 and the back LF antenna 29. Specifically, the front left sensor unit 24 and the front right sensor unit 25 are in the radiation pattern 32 of the front LF antenna 28, and the back left sensor unit 26 and the back right sensor unit 27 are in the radiation pattern 33 of the back LF antenna 29.

The second important point of the first arrangement example is that, the "front LF antenna 28" is installed at the position $P_{FA}$ substantially on the line of the front virtual line $L_F$, and shifted by a predetermined amount $\Delta_R$ in the right direction from the intermediate point $P_{FC}$ of the front virtual line $L_F$, and the "back LF antenna 29" is installed at the position $P_{BA}$ substantially on the line of the back virtual line $L_B$, and shifted by a predetermined amount $\Delta_R$ in the right direction from the intermediate point $P_{BC}$ of the back virtual line $L_B$, as described above, that is, arrangement is made such that each distance between the LF antenna and the two sensor units is different.

That is, the center of the radiation pattern 32 of the front LF antenna 28 in the first arrangement example is the "position $P_{FA}$ substantially on the line of the front virtual line $L_F$, and shifted by a predetermined amount $\Delta_R$ in the right direction from the intermediate point $P_{FC}$ of the front virtual line $L_F$", and thus a distance A from the center (position $P_{FA}$) of the pattern 32 to the front left sensor unit 24 and a distance B from the center (position $P_{FA}$) of the pattern 32 to the front right sensor unit 25 is in a relationship of A>B. Similarly, the center of the radiation pattern 33 of the back LF antenna 29 in the first arrangement example is the "position $P_{BA}$ substantially on the line of the back virtual line $L_B$, and shifted by a predetermined amount $\Delta_R$ in the right direction from the intermediate point $P_{BC}$ of the back virtual line $L_B$", and thus a distance A from the center (position $P_{BA}$) of the pattern 33 to the back left sensor unit 26 and a distance B from the center (position $P_{BA}$) of the pattern 33 to the back right sensor unit 27 is in a relationship of A>B. The difference between A and B corresponds to $\Delta_R$.

As described above, since "the strength of the radio wave transmitted from the antenna decreases exponentially the farther the distance from the antenna", with respect to the LF signal (response request signal from each LF antenna 28, 29) received by the pair of sensor units (here, pair of front left sensor unit 24 and front right sensor unit 25, and pair of back left sensor unit 26 and back right sensor unit 27) in the relationship A>B, the LF signal received on the distance A side (front left sensor unit 24 and back left sensor unit 26) has smaller reception power (smaller reception level) than the LF signal received on the distance B side (front right sensor unit 25 and back right sensor unit 27). Therefore, the position of each sensor unit can be determined based on the difference in the reception level in the tire monitor device to be hereinafter described (tire monitor device 36 of FIG. 6) by measuring the reception level of the LF signal (response request signal) at each sensor unit, and returning the measurement result in the response signal.

The appropriate shift amount $\Delta_R$ of the front LF antenna 28 and the back LF antenna 29 is set according to the following way of thinking. Suppose the shift amount $\Delta_R$ is too small. In this case, the difference between the distances A and B becomes small, and thus the reception power difference of the LF signal (response request signal) received on the distance B side (front right sensor unit 25 and back right sensor unit 27) and the LF signal (response request signal) received on the distance A side (front left sensor unit 24 and back left sensor unit 26) becomes small. Such small reception power difference is easily mistaken as reception power fluctuation of the LF signal (response request signal) naturally generated with the rotation of the tire, and causes erroneous recognition in determining the position of each sensor unit. For such reason, in setting an appropriate shift amount $\Delta_R$ of the front LF antenna 28 and the back LF antenna 29, a large shift amount $\Delta_R$ of an extent sufficiently large reception power difference is obtained compared to the reception fluctuation is desirable to distinguish from the reception power fluctuation of the LF signal (response request signal) naturally generated with the rotation of the tire.

<Antenna Radiation Pattern of Second Arrangement Example>

Figure 4:
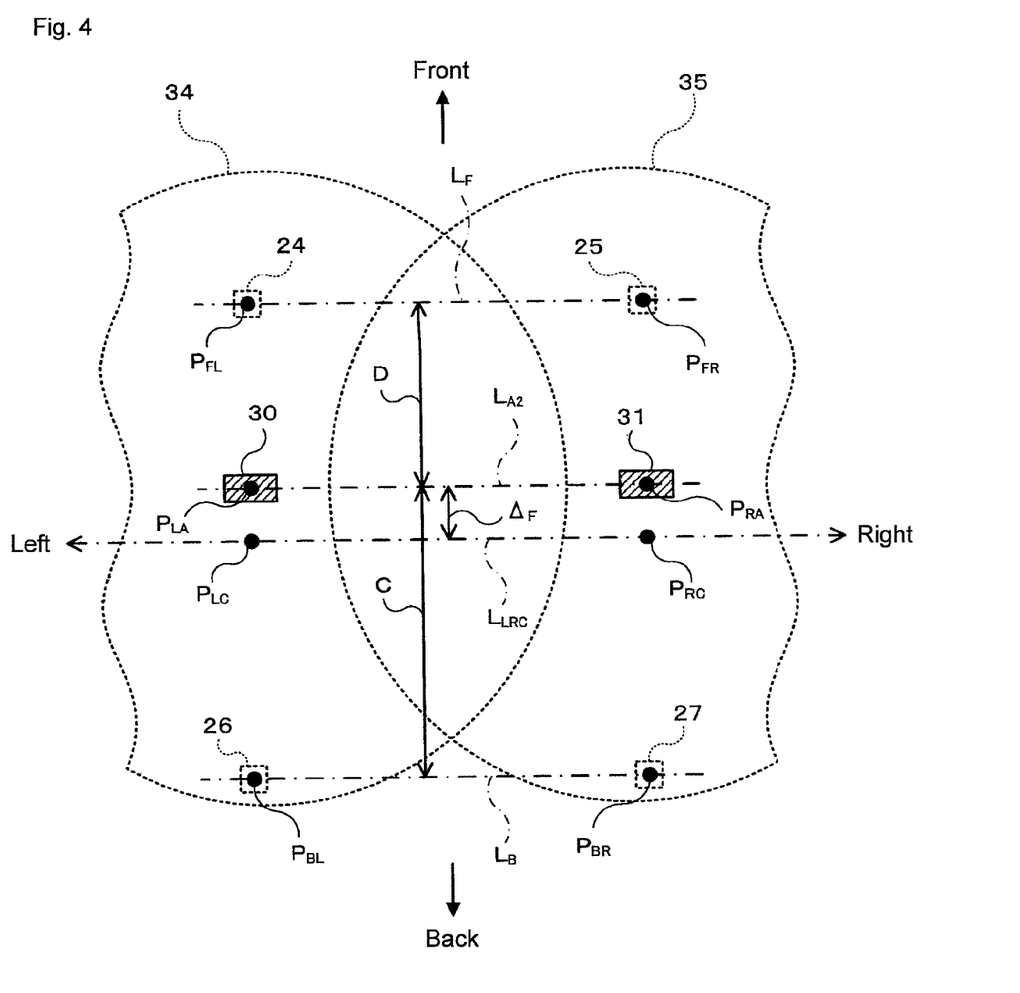
FIG. 4 is a brief schematic view showing a radiation pattern in the horizontal direction of a left LF antenna 30 and a right LF antenna 31 in the second arrangement example.
Figure 5B:
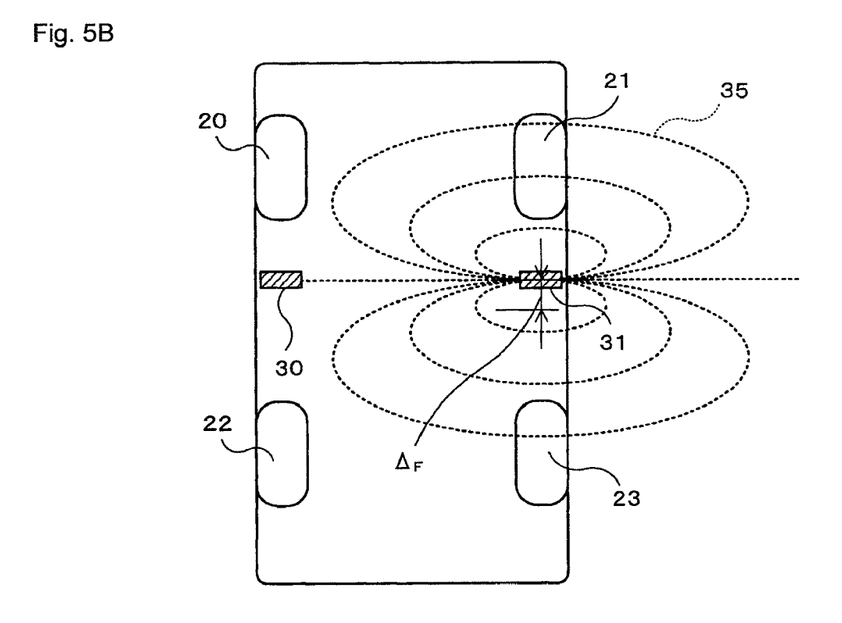

FIG. 4 is a brief schematic view showing a radiation pattern in the horizontal direction of the left LF antenna 30 and the right LF antenna 31 in the second arrangement example (example of left and right arrangement: FIG. 2). In the figure, radiation patterns 34, 35 of the LF antennas 30, 31 are drawn as a non-directional pattern (substantially circular pattern) for the sake of convenience of the explanation. Actually, as shown in FIG. 5B, a coil shaft of the right LF antenna 31 is coincided with a coil shaft of a sensor side LF reception antenna (not shown) incorporated in the front right tire 21 and the back right tire 23 arranged in the front and back direction, and similarly, a coil shaft of the left LF antenna 30 is coincided with a coil shaft of a sensor side LF reception antenna (not shown) incorporated in the front left tire 20 and the back left tire 22 arranged in the front and back direction. The radiation pattern (magnetic flux) of the right LF antenna 31 then becomes parallel to the magnetic flux of the sensor by arranging the coil shaft in the above manner. That is, the response request signal transmitted from the right LF antenna 31 is easily received at the sensor incorporated in the front right tire 21 and the back right tire 23, but is hard to be received at the sensor incorporated in the front left tire 20 and the back left tire 22. Therefore, adjustment of the transmission power of the right LF antenna 31 and the like can be easily carried out for only two sensors desiring response to receive the signal. The radiation pattern (magnetic flux) of the left LF antenna 30 is also parallel to the magnetic flux of the sensor, and thus is similar.

The illustrated radiation patterns 34, 35 are plotted with limit distance the response request signal transmitted from the respective LF antenna (left LF antenna 30 and right LF antenna 31) is normally received by the sensor unit 24 to 27 of each tire 20 to 23. That is, the strength of the radio wave transmitted from the antenna generally decreases exponentially the farther the distance from the antenna, and cannot be normally received beyond a certain distance (limit distance). The illustrated radiation patterns 34, 35 show such limit distance.

The first important point of the second arrangement example is that two sensor units positioned in the front and back direction of the vehicle of the sensor units are in the radiation pattern 34, 35 of the left LF antenna 30 and the right LF antenna 31. Specifically, the front left sensor unit 24 and the back left sensor unit 26 are in the radiation pattern 34 of the left LF antenna 30, and the front right sensor unit 25 and the back right sensor unit 27 are in the radiation pattern 35 of the right LF antenna 31.

The second important point of the second arrangement example is that, the "left LF antenna 30" is installed at the position $P_{LA}$ substantially on the line of the left virtual line $L_L$, and shifted by a predetermined amount $\Delta_F$ in the front direction from the intermediate point $P_{LC}$ of the left virtual line $L_L$, and the "right LF antenna 31" is installed at the position $P_{RA}$ substantially on the line of the right virtual line $L_R$, and shifted by a predetermined amount $\Delta_F$ in the front direction from the intermediate point $P_{RC}$ of the right virtual line $L_R$, as described above, that is, arrangement is made such that each distance between the LF antenna and the two sensor units is different.

That is, the center of the radiation pattern 34 of the left LF antenna 30 in the second arrangement example is the "position $P_{LA}$ substantially on the line of the left virtual line $L_L$, and shifted by a predetermined amount $\Delta_F$ in the front direction from the intermediate point $P_{LC}$ of the left virtual line $L_L$", and thus a distance C from the center (position $P_{LA}$) of the pattern 34 to the back left sensor unit 26 and a distance D from the center (position $P_{LA}$) of the pattern 34 to the front left sensor unit 24 is in a relationship of C>D. Similarly, the center of the radiation pattern 35 of the right LF antenna 31 in the second arrangement example is the "position $P_{RA}$ substantially on the line of the right virtual line $L_R$, and shifted by a predetermined amount $\Delta_F$ in the front direction from the intermediate point $P_{RC}$ of the right virtual line $L_R$", and thus a distance C from the center (position $P_{RA}$) of the pattern 35 to the back right sensor unit 27 and a distance D from the center (position $P_{RA}$) of the pattern 35 to the front right sensor unit 25 is in a relationship of C>D. The difference between C and D corresponds to $\Delta_F$.

As described above, since "the strength of the radio wave transmitted from the antenna decreases exponentially the farther the distance from the antenna", with respect to the LF signal (response request signal from each LF antenna 30 and 31) received by the pair of sensor units (here, pair of back left sensor unit 26 and front left sensor unit 24, and pair of back right sensor unit 27 and front right sensor unit 25) in the relationship C>D, the LF signal received on the distance C side (back left sensor unit 26 and back right sensor unit 27) has smaller reception power (smaller reception level) than the LF signal received on the distance D side (front left sensor unit 24 and front right sensor unit 25). Therefore, the position of each sensor unit can be determined based on the difference in the reception level in the tire monitor device to be hereinafter described (tire monitor device 36 of FIG. 6) by measuring the reception level of the LF signal (response request signal) at each sensor unit, and returning the measurement result in the response signal.

The appropriate shift amount $\Delta_F$ of the left LF antenna 30 and the right LF antenna 31 is set according to the following way of thinking. Suppose the shift amount $\Delta_F$ is too small. In this case, the difference between the distances C and D becomes small, and thus the reception power difference of the LF signal (response request signal) received on the distance D side (front left sensor unit 24 and front right sensor unit 25) and the LF signal (response request signal) received on the distance C side (back left sensor unit 26 and back right sensor unit 27) becomes small. Such small reception power difference is easily mistaken as reception power fluctuation of the LF signal (response request signal) naturally generated with the rotation of the tire, and causes erroneous recognition in determining the position of each sensor unit. For such reason, in setting an appropriate shift amount $\Delta_F$ of the left LF antenna 30 and the right LF antenna 31, a large shift amount $\Delta_F$ of an extent sufficiently large reception power difference is obtained compared to the reception fluctuation is desirable to distinguish from the reception power fluctuation of the LF signal (response request signal) naturally generated with the rotation of the tire.

<Configuration of Tire Monitor Device>

Figure 6:
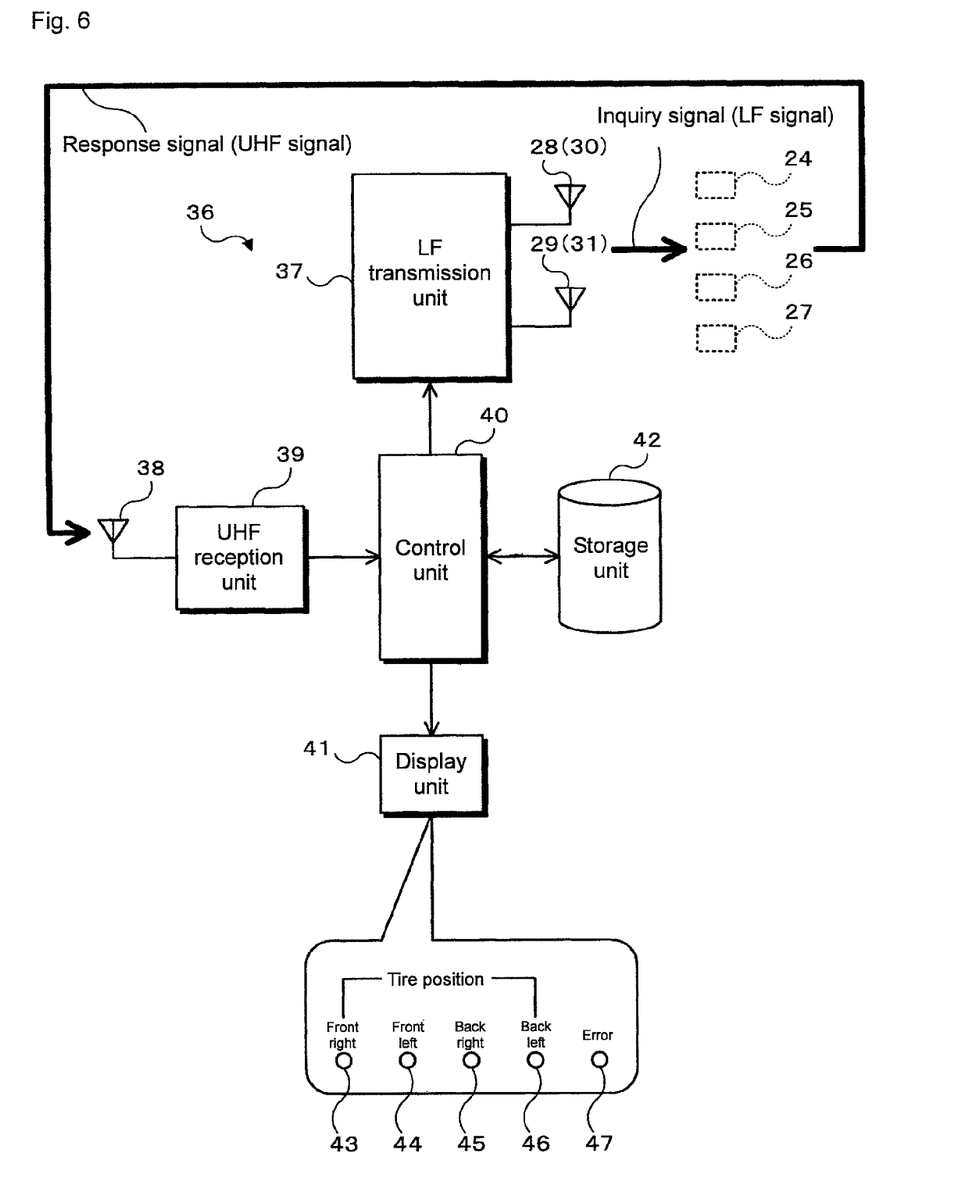
FIG. 6 shows a conceptual configuration view of a tire monitor device according to an embodiment of the present invention.

FIG. 6 shows a conceptual configuration view of the tire monitor device of an embodiment of the present invention. The illustrated configuration shows position determination of the sensor unit and the mechanism of displaying the determination result in an extracted manner, where other configurations such as a mechanism of notifying a warning such as a lack of air pressure of the tire and the like to a passenger based on information from the sensor unit which position is determined is not shown for convenience to avoid congestion of the drawings.

In the figure, the tire monitor device 36 of the present embodiment includes the two LF antennas described above, that is, the front LF antenna 28 and the back LF antenna 29 shown in FIG. 1 (or left LF antenna 30 and right LF antenna 31 shown in FIG. 2), the four sensor units 24 to 27 attached to the four tires 20 to 23, an LF transmission unit 37 for sequentially transmitting a response request signal (LF signal) of LF band while driving in a time division manner the two LF antennas by a control signal from a control unit 40 to be hereinafter described, an UHF reception unit 39 for receiving a response signal (UHF signal) of UHF band returned from the sensor units 24 to 27 in response to the response request signal through an UHF antenna 38 and reproducing information such as air pressure and LF signal level to be hereinafter described contained in the response signal, the control unit 40 for controlling the transmission sequence of the LF transmission unit 37 and retrieving the information reproduced in the UHF reception unit 39 and determining the position of the sensor unit, a display unit 41 for displaying the determination result, and a storage unit 42 for storing and holding control program and the like to be hereinafter described.

The control unit 40 is configured by a microcomputer and a peripheral circuit. The storage unit 42 may be an external memory, or a RAM in the microcomputer. They are not limited to the above.

The display unit 41 may include a "front right indication lamp 43", a "front left indication lamp 44", a "back right indication lamp 45", and a "back left indication lamp 46" indicating the tire positions, as well as an "error indication lamp 47" indicating an indefinite determination result.

Figure 7:
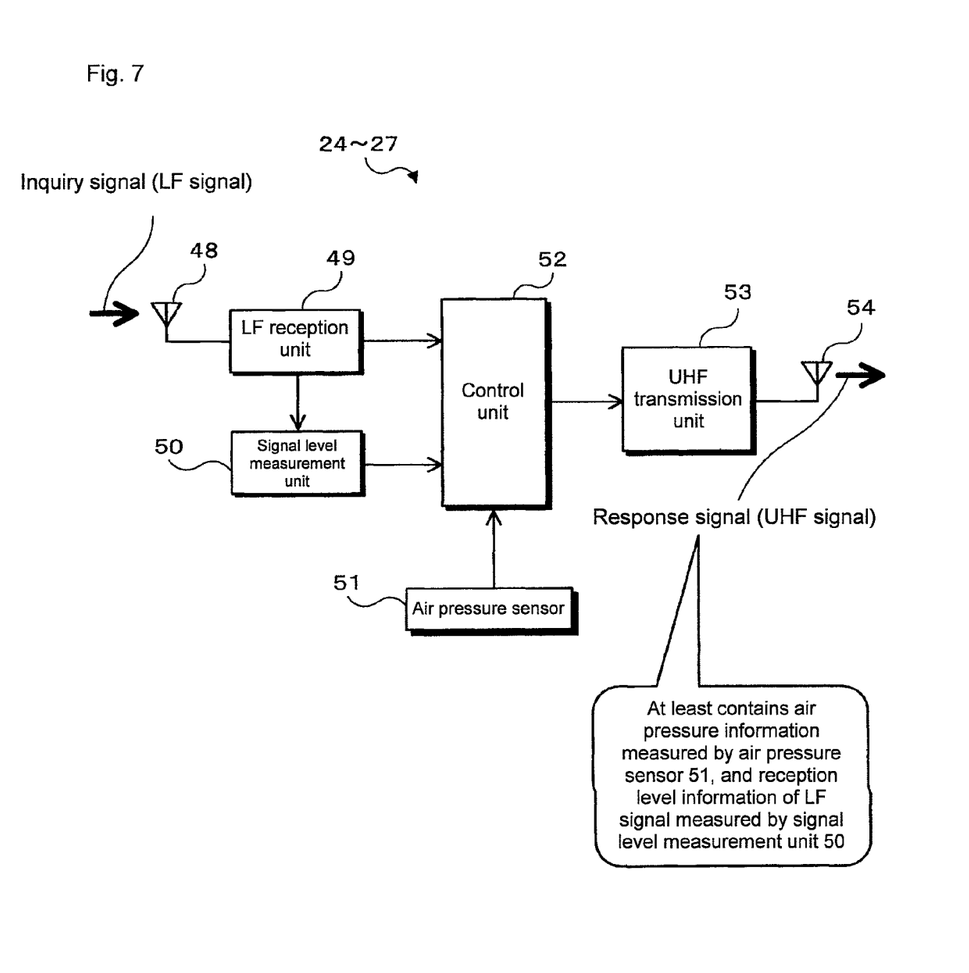
FIG. 7 shows a common conceptual configuration view of each sensor unit 24 to 27.

FIG. 7 shows a common conceptual configuration view of each sensor unit 24 to 27. Each sensor unit 24 to 27 includes an LF reception unit 49 for receiving through an LF antenna 48 a response request signal (response request signal transmitted from the front LF antenna 28 or the back LF antenna 29 in the case of the first arrangement example, response request signal transmitted from the left LF antenna 30 or the right LF antenna 31 in the case of the second arrangement example) of the LF band transmitted from the tire monitor device 36, a signal level measurement unit 50 for measuring a signal level of the LF signal received by the LF reception unit 49, an air pressure sensor 51 for measuring an air pressure of the tire attached with each sensor unit (air pressure of the front left tire 20 in the case of front left sensor unit 24, air pressure of front right tire 21 in the case front right sensor unit 25, air pressure of back left tire 22 in the case of back left sensor unit 26, air pressure of the back right tire 23 in the case of back right sensor unit 27), a control unit 52 for generating a predetermined response signal in response to the reception when receiving the response request signal by the LF reception unit 49, and an UHF transmission unit 53 for modulating the response signal generated in the control unit 52 to the UHF signal, and transmitting the same through an UHF antenna 54.

The time until transmitting the response signal after each sensorg receives the response request signal is determined by the control unit 52 of each sensor unit so as to be random. For instance, the control unit 52 generates a random number, determines the time until response based on the value, and performs a control so as to transmit the response signal after elapse of such time. The response signal from each sensor unit is prevented from interfering in such manner.

The above-described response signal at least contains air pressure information measured by the air pressure sensor 51, and reception level information of the LF signal measured by the signal level measurement unit 50.

The position determining operation of the sensor unit in the present embodiment will be described below.

<Position Determining Operation of Sensor Unit: Correspond to First Arrangement Example>

Figure 8:
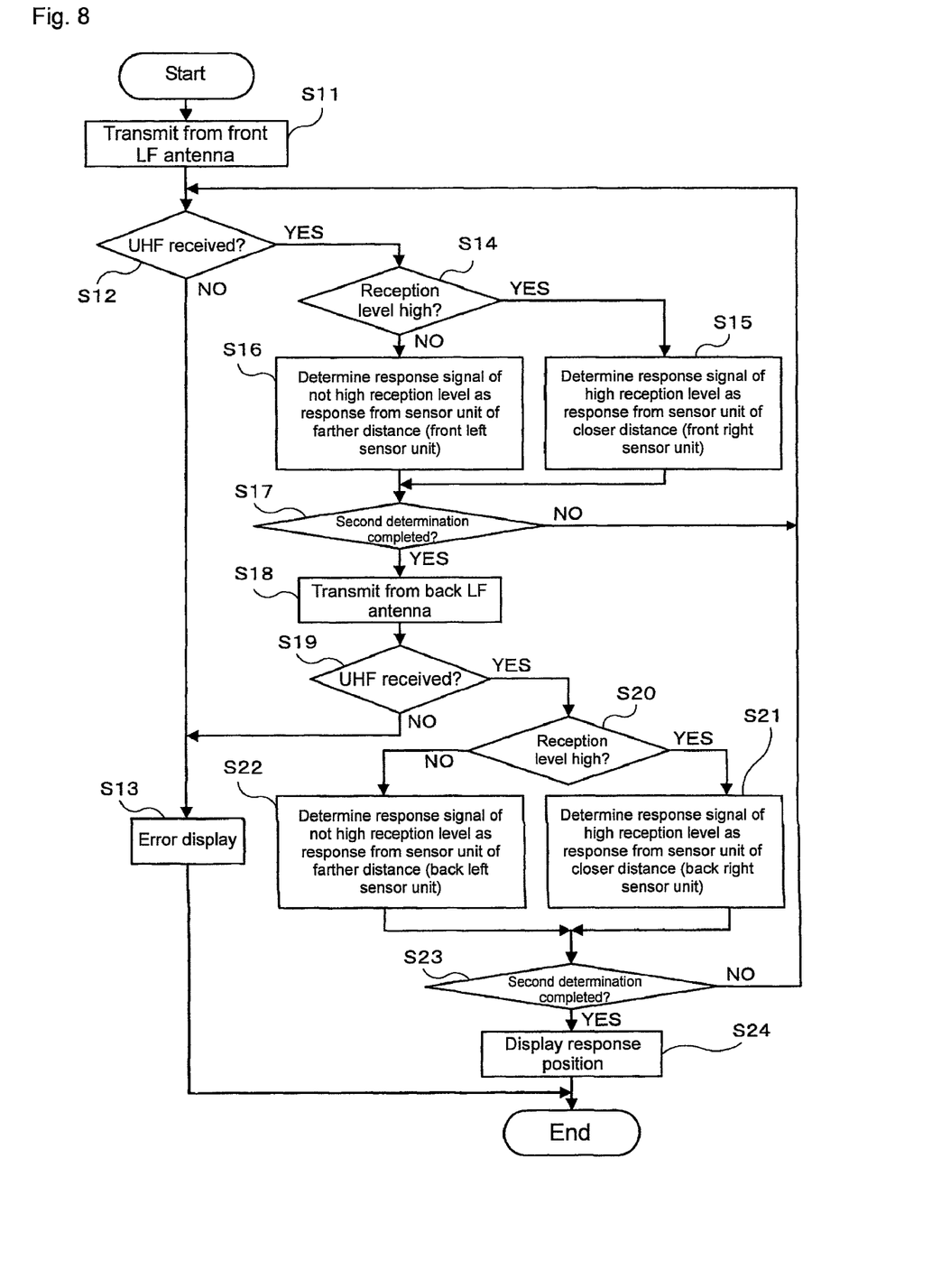
FIG. 8 is a view showing a schematic flow of a control program corresponding to the first arrangement example repeatedly executed for every predetermined cycle in a control unit 40.

FIG. 8 is a view showing a schematic flow of a control program corresponding to the first arrangement example repeatedly executed for every predetermined cycle in the control unit 40. After the execution of the control program is started, the response request signal (LF signal) is transmitted from the front LF antenna 28 (step S11), and then the reception of the UHF signal (response signal from the sensor unit) is determined (step S12). If the UHF signal cannot be received, determination is made that some kind of trouble has occurred, and the required error display (e.g., lighting of the error indicating lamp 47, and the like) is performed (step S13), and the flow is terminated.

If the UHF signal is received in step S12, the reception level information (reception level information of the LF signal measured by the signal level measurement unit 50) contained in the UHF signal (response signal) is taken out, and whether or not the reception level is greater than a predetermined value is determined (i.e., whether or not the reception level is high) (step S14). If normal, the two response signals from the front right sensor unit 25 and the front left sensor unit 24 are received, the response signal of high reception level is determined as the response from the sensor unit of closer distance, specifically, the front right sensor unit 25 on the distance B side in FIG. 3 (step S15), and the response signal of not high reception level is determined as the response from the sensor unit of farther distance, specifically, the front left sensor unit 24 on the distance A side in FIG. 3 (step S16). Alternatively, the reception level information contained in the response signal from the front right sensor unit 25 and the reception level information contained in the response signal from the front left sensor unit 24 may be relatively compared, and the higher reception level may be determined as the response from the front right sensor unit 25.

Determination is made on whether or not the second determination is completed (step S17), where the process returns to step S12 if the second determination is not completed, and the response request signal (LF signal) is transmitted from the back LF antenna 29 if the second determination is completed (step S18), and reception of the UHF signal (response signal from the sensor unit) is determined (step S19). If the UHF signal cannot be received, determination is made that some kind of trouble has occurred, and the required error display (e.g., lighting of the error indicating lamp 47, and the like) is performed (step S13), and the flow is terminated.

If the UHF signal is received in step S19, the reception level information (reception level information of the LF signal measured by the signal level measurement unit 50) contained in the UHF signal (response signal) is taken out, whether or not the reception level is greater than a predetermined value is determined (i.e., whether or not the reception level is high) (step S20), the response signal of high reception level is determined as the response from the sensor unit of closer distance, specifically, the back right sensor unit 27 on the distance B side in FIG. 3 (step S21), and the response signal of not high reception level is determined as the response from the sensor unit of farther distance, specifically, the back left sensor unit 26 on the distance A side in FIG. 3 (step S22).

Determination is again made on whether or not the second determination is completed (step S23), the process returns to step S12 if the second determination is not completed, and finally, if the second determination is completed, an appropriate indication lamp (front right indication lamp 43, front left indication lamp 44, back right indication lamp 45, and back left indication lamp 46) of the display unit 41 is selectively driven to perform the response position display (step S24) according to the position determination results (determination results of step S15, step S16, step S21, step S22), and thereafter, the execution of the program is terminated. For instance, if the air pressure information contained in the signal determined as the response signal from the front right sensor unit 25 is determined as abnormal, the front right indication lamp 43 is turned on. As other embodiments, an ID number of the sensor unit contained in the response signal is stored in the storage unit 42 by the control unit 40 in correspondence to the position determination result. For instance, the command of the response request signal is set to a content of returning the ID number and the reception level, and the ID number and the reception level information are contained in the response signal from the sensor unit. When each ID number is corresponded with each tire position once, the reception level information does not need to be used from the next position determination, and the control processing can be simplified. When the ID number and the tire position are stored in correspondence to each other, the air pressure information may not be contained in the response signal.

In step S17 and step S23, "whether or not the second determination is completed" is examined for the following reasons. The response signal is returned from the two sensors by the transmission of one response request signal, but the timing of returning is designed to differ by a random number, and thus the response signal from one of the sensors is received in the one UHF reception. Thus, the flow of "reception"→"determination" needs to be performed twice to receive the two response signals.

<Position Determining Operation of Sensor Unit: Correspond to Second Arrangement Example>

Figure 9:
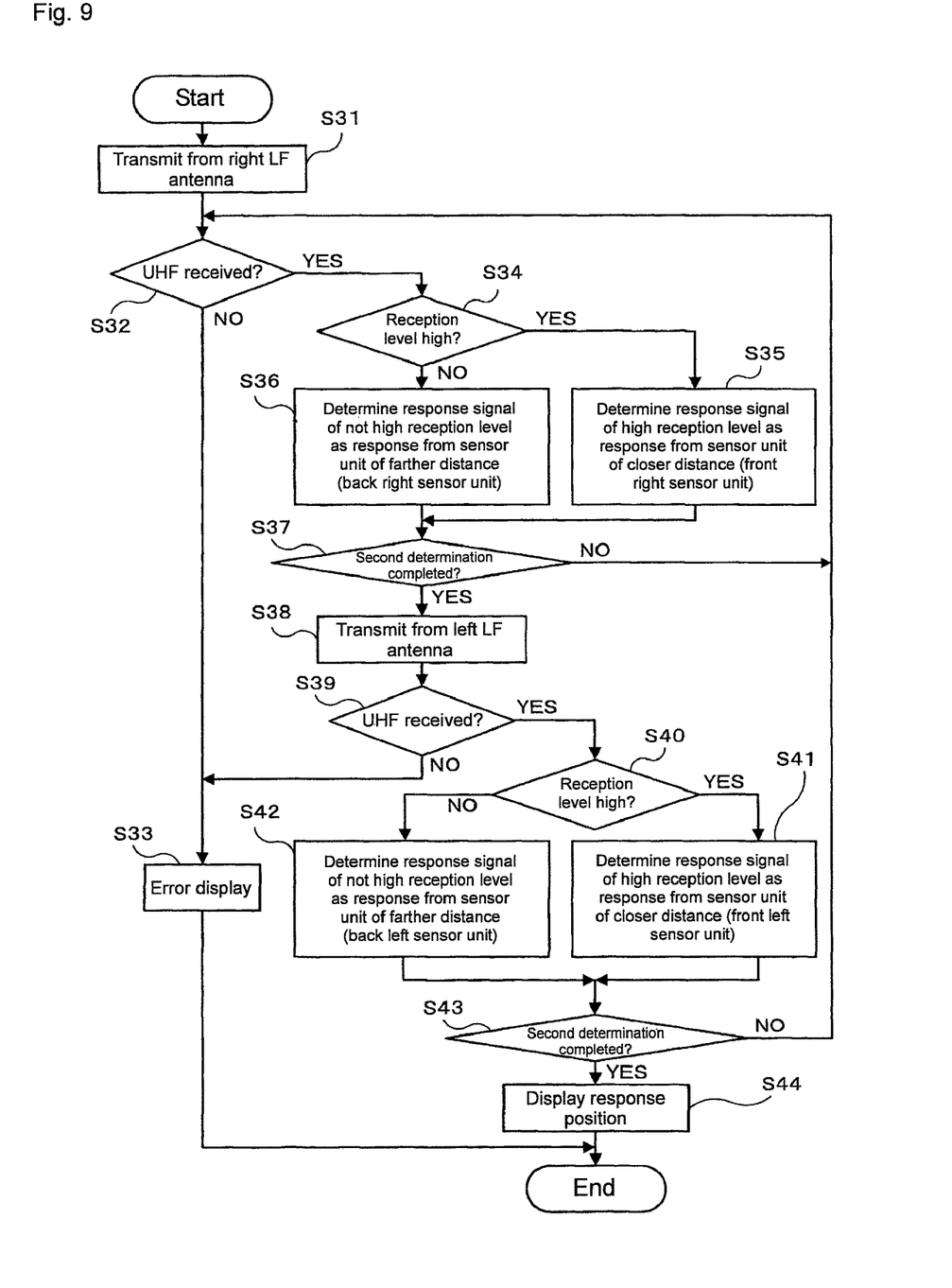
FIG. 9 is a view showing a schematic flow of a control program corresponding to the second arrangement example repeatedly executed for every predetermined cycle in the control unit 40.

FIG. 9 is a view showing a schematic flow of a control program corresponding to the second arrangement example repeatedly executed for every predetermined cycle in the control unit 40. After the execution of the control program is started, the response request signal (LF signal) is transmitted from the right LF antenna 31 (step S31), and then the reception of the UHF signal (response signal from the sensor unit) is determined (step S32). If the UHF signal cannot be received, determination is made that some kind of trouble has occurred, and the required error display (e.g., lighting of the error indicating lamp 47, and the like) is performed (step S33), and the flow is terminated.

If the UHF signal is received in step S32, the reception level information (reception level information of the LF signal measured by the signal level measurement unit 50) contained in the UHF signal (response signal) is taken out, whether or not the reception level is greater than a predetermined value is determined (i.e., whether or not the reception level is high) (step S34), the response signal of high reception level is determined as the response from the sensor unit of closer distance, specifically, the front right sensor unit 25 on the distance D side in FIG. 4 (step S35), and the response signal of not high reception level is determined as the response from the sensor unit of farther distance, specifically, the back right sensor unit 27 on the distance C side in FIG. 4 (step S36).

Determination is made on whether or not the second determination is completed (step S37), where the process returns to step S32 if the second determination is not completed, and the response request signal (LF signal) is transmitted from the left LF antenna 30 if the second determination is completed (step S38), and reception of the UHF signal (response signal from the sensor unit) is determined (step S39). If the UHF signal cannot be received, determination is made that some kind of trouble has occurred, and the required error display (e.g., lighting of the error indicating lamp 47, and the like) is performed (step S33), and the flow is terminated.

If the UHF signal is received in step S39, the reception level information (reception level information of the LF signal measured by the signal level measurement unit 50) contained in the UHF signal (response signal) is taken out, whether or not the reception level is greater than a predetermined value is determined (i.e., whether or not the reception level is high) (step S40), the response signal of high reception level is determined as the response from the sensor unit of closer distance, specifically, the front left sensor unit 24 on the distance D side in FIG. 4 (step S41), and the response signal of not high reception level is determined as the response from the sensor unit of farther distance, specifically, the back left sensor unit 26 on the distance C side in FIG. 4 (step S42).

Determination is again made on whether or not the second determination is completed (step S43), the process returns to step S32 if the second determination is not completed, and finally, if the second determination is completed, an appropriate indication lamp (front right indication lamp 43, front left indication lamp 44, back right indication lamp 45, and back left indication lamp 46) of the display unit 41 is selectively driven to perform the response position display (step S44) according to the position determination results (determination results of step S35, step S36, step S41, step S42), and thereafter, the execution of the program is terminated.

Summary of Embodiment

As described above, according to the present embodiment, since the front LF antenna 28 and the back LF antenna 29 are respectively arranged at the position shifted by a predetermined amount $\Delta_R$ in either the left or right direction from the intermediate position ($P_{FC}$ or $P_{BC}$) of the left and right sensor units (front left sensor unit 24 and front right sensor unit 25, and back left sensor unit 26 and back right sensor unit 27) (first arrangement example), or since the left LF antenna 30 and the right LF antenna 31 are respectively arranged at the position shifted by a predetermined amount $\Delta_F$ in either the front or back direction from the intermediate position ($P_{LC}$ or $P_{RC}$) of the front and back sensor units (front left sensor unit 24 and back left sensor unit 26, and front right sensor unit 25 and back right sensor unit 27) (second arrangement example), the response request signal (LF signal) transmitted from the antennas is given a difference in the reception level when being received at each sensor unit. Thus, the position of each sensor unit can be determined based on the reception level in the tire monitor device by measuring the reception level at each sensor unit, and returning the same to the tire monitor device (tire monitor device 36 of FIG. 6) in the response signal from each sensor unit.

Therefore, in comparison to the "related art" described at the beginning, provided is a tire monitor device in which the number of LF antennas can be reduced to two (in the case of four-wheeled automobile), the position of the sensor unit (tire) returning the response signal can be gasped while reducing cost, and efficient adjustment can be made.

The technical matters of the present example are clearly shown as follows.

(1) Position of LF antenna transmitting the response request signal (LF signal):

First arrangement example: position ($P_{FA}$, $P_{BA}$) shifted by a predetermined amount ($\Delta_R$) in either the left or right direction from the intermediate point ($P_{FC}$, $P_{BC}$) between the left and right tires (see FIGS. 1 and 3)

Second arrangement example: position ($P_{LA}$, $P_{RA}$) shifted by a predetermined amount ($\Delta_F$) in either the front or back direction from the intermediate point ($P_{LC}$, $P_{RC}$) between the front and back tires (see FIGS. 2 and 4)

(2) Measure the reception level of the response request signal (LF signal) in each sensor unit 24 to 27:

The signal level measurement unit 50 measures the signal level of the LF signal received by the LF reception unit 49. In (1), the position of the LF antenna transmitting the response request signal (LF signal) is shifted by a predetermined amount ($\Delta_R$) in either the left or right direction from the intermediate point ($P_{FC}$, $P_{BC}$) between the left and right tires (in the case of first arrangement example) or shifted by a predetermined amount ($\Delta_F$) in either the front or back direction from the intermediate point ($P_{LC}$, $P_{RC}$) between the front and back tires (in the case of second arrangement example), and thus a difference corresponding to the shift amount ($\Delta_R$ in the case of the first arrangement example and $\Delta_F$ in the case of the second arrangement example) appears in the reception level of the response request signal (LF signal) measured by each sensor unit 24 to 27.

(3) Each sensor unit 24 to 27 returns the measured reception level of the LF signal in the response signal:

The tire monitor device 36 compares the "reception level of the LF signal" contained in the response signal from each sensor unit 24 to 27, and determines the position of each sensor unit 24 to 27 based on the "difference". That is, when the response request signal is transmitted from the front LF antenna 28, the "reception level of the LF signal" in the two response signals returned from the front left sensor unit 24 and the front right sensor unit 25 are compared, the signal of higher reception level is determined as the response from the front right sensor unit 25 closer to the front LF antenna 28 and the other is determined as the response from the front left sensor unit 24 distant from the front LF antenna 28. When the response request signal is transmitted from the back LF antenna 29, the "reception level of the LF signal" in the two response signals returned from the back left sensor unit 26 and the back right sensor unit 27 are compared, the signal of higher reception level is determined as the response from the back right sensor unit 27 closer to the back LF antenna 29 and the other is determined as the response from the back left sensor unit 26 distant from the back LF antenna 29 (in the case of the first arrangement example).

When the response request signal is transmitted from the left LF antenna 30, the "reception level of the LF signal" in the two response signals returned from the front left sensor unit 24 and the back left sensor unit 26 are compared, the signal of higher reception level is determined as the response from the front left sensor unit 24 closer to the left LF antenna 30 and the other is determined as the response from the back left sensor unit 26 distant from the left LF antenna 30. When the response request signal is transmitted from the right LF antenna 31, the "reception level of the LF signal" in the two response signals returned from the front right sensor unit 25 and the back right sensor unit 27 are compared, the signal of higher reception level is determined as the response from the front right sensor unit 25 closer to the right LF antenna 31 and the other is determined as the response from the back right sensor unit 27 distant from the right LF antenna 31 (in the case of the second arrangement example).

The signal level measurement unit 50 of each sensor unit 24 to 27 may measure the signal level of the LF signal received by the LF reception unit 49 at a predetermined timing (e.g., timing of start of signal of the LF signal, or timing after elapse of predetermined time from start of reception) but, may measure the signal level of the LF signal continuously for a predetermined time (time required for one rotation or few rotations of the tire) to ensure accuracy of measurement, and an average value or an integrated value, or a peak value of the measurement value may be used for the measurement result. Through the use of such a value, the influence of level fluctuation of the LF signal by the rotation of the tire can be suppressed.

What is claimed is:

1. A tire monitor device for a vehicle comprising:
   a first antenna and a second antenna;
   a sensor unit attached to each of a front left tire, a front right tire, a back left tire, and a back right tire; and
   a determining unit,
   wherein the tire monitor device is operable to transmit a response request signal from the first and second antennas with respect to at least one of the sensor units, and to monitor information of at least one of the tires based on a response signal returned from the at least one sensor unit in response to the response request signal;
   wherein the first antenna is arranged at a position shifted by a predetermined amount in a left or right direction from an intermediate position between the front left and the front right tires;
   wherein the second antenna is arranged at a position shifted by a predetermined amount in a left or right direction from an intermediate position between the back left and the back right tires;
   wherein the sensor unit measures a reception level of the response request signal, and returns a measurement result in the response signal; and
   wherein the determining unit is operable to determine a position of each sensor unit based on information of the reception level of the response request signal contained in the response signal returned from each of the sensor units.

2. The tire monitor device according to claim 1, wherein each of the sensor units includes a measurement unit for measuring the reception level of the response request signal transmitted from at least one of the first and second antennas as an average value, an integrated value, or a peak value in between of one rotation or a few rotations of at least one of the tires.

3. The tire monitor device according to claim 2, wherein at least one of the first and second antennas is a low frequency band LF antenna, and for at least one of the tires, the determining unit receives the response signal from the sensor unit with a high frequency band UHF antenna.

4. The tire monitor device according to claim 1, wherein at least one of the first and second antennas is a low frequency band LF antenna, and for at least one of the tires, the determining unit receives the response signal from the sensor unit with a high frequency band UHF antenna.

5. A tire monitor device for a vehicle comprising:
   a first antenna and a second antenna;
   a sensor unit attached to each of a front left tire, a front right tire, a back left tire, and a back right tire; and
   a determining unit,
   wherein the tire monitor device is operable to transmit a response request signal from the first and second antennas with respect to at least one of the sensor units, and to monitor information of at least one of the tires based on a response signal returned from the at least one sensor unit in response to the response request signal;
   wherein the first antenna is arranged at a position shifted by a predetermined amount in a front or back direction from an intermediate position between the front left and the back left tires;
   wherein the second antenna is arranged at a position shifted by a predetermined amount in front or back direction from an intermediate position between the front right and the back right tires;
   wherein the sensor unit measures a reception level of the response request signal, and returns a measurement result in the response signal; and
   wherein the determining unit is operable to determine a position of each sensor unit based on information of the reception level of the response request signal contained in the response signal returned from each of the sensor units.

6. The tire monitor device according to claim 5, wherein each of the sensor units includes a measurement unit for measuring the reception level of the response request signal transmitted from at least of the first and second antennas as an average value, an integrated value, or a peak value in between of one rotation or a few rotations of at least one of the tires.

7. The tire monitor device according to claim 6, wherein at least one of the first and second antennas is a low frequency band LF antenna, and for at least one of the tires, the determining unit receives the response signal from the sensor unit with a high frequency band UHF antenna.

8. The tire monitor device according to claim 5, wherein at least one of the first and second antennas is a low frequency band LF antenna, and for at least one of the tires, the determining unit receives the response signal from the sensor unit with a high frequency band UHF antenna.

* * * * *